(12) United States Patent
Seder et al.

(10) Patent No.: US 11,898,867 B2
(45) Date of Patent: Feb. 13, 2024

(54) RECORDED ROUTE REPLAY ON AN AUGMENTED REALITY HEAD-UP DISPLAY APPLICATION

(71) Applicant: GM Global Technology Operations LLC, Detroit, MI (US)

(72) Inventors: Thomas A. Seder, Fraser, MI (US); Kai-Han Chang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 158 days.

(21) Appl. No.: 17/542,899

(22) Filed: Dec. 6, 2021

(65) Prior Publication Data
US 2023/0175855 A1    Jun. 8, 2023

(51) Int. Cl.
| | |
|---|---|
| *G01C 21/36* | (2006.01) |
| *H04N 5/77* | (2006.01) |
| *H04N 9/87* | (2006.01) |
| *H04N 7/18* | (2006.01) |

(Continued)

(52) U.S. Cl.
CPC ....... *G01C 21/3647* (2013.01); *G01C 21/365* (2013.01); *G01C 21/3632* (2013.01); *G01C 21/3661* (2013.01); *H04N 5/77* (2013.01); *H04N 7/183* (2013.01);
(Continued)

(58) Field of Classification Search
CPC ............ G01C 21/3647; G01C 21/3632; G01C 21/365; G01C 21/3661; G01C 21/3602; G01C 21/362; H04N 5/77; H04N 7/183; H04N 9/8715; G10L 15/22; G10L 2015/223; H04R 1/08
See application file for complete search history.

(56) References Cited

U.S. PATENT DOCUMENTS

| | | | |
|---|---|---|---|
| 10,427,602 B1 | 10/2019 | Bertollini et al. | |
| 2003/0182052 A1* | 9/2003 | DeLorme | G06Q 10/047 340/990 |
| 2004/0204851 A1 | 10/2004 | Fukuyasu | |

(Continued)

FOREIGN PATENT DOCUMENTS

CN    106767887 A  *  5/2017

OTHER PUBLICATIONS

Machine translation of CN-106767887-A (Year: 2017).*

(Continued)

*Primary Examiner* — Alan D Hutchinson
(74) *Attorney, Agent, or Firm* — Vivacqua Crane PLLC

(57) ABSTRACT

A method for replaying route data with annotation for re-display comprises: recording a recorded-route-replay by a first user of a first automobile vehicle and saving the recorded-route-replay to a website; electing to trigger playback of the recorded-route-replay by a second user of a second automobile vehicle and entering a predetermined key word by the second user to trigger playback; contacting a website and downloading from the website GPS tagged pictures for a predetermined next trip travel distance of the second automobile vehicle; and retrieving one of the GPS tagged pictures when a GPS trigger location is reached during the trip of the second automobile vehicle and displaying the one of the GPS tagged pictures on an image screen of a head-up display of second automobile vehicle.

20 Claims, 6 Drawing Sheets

(51) Int. Cl.
   *G10L 15/22* (2006.01)
   *H04R 1/08* (2006.01)

(52) U.S. Cl.
   CPC ........... *H04N 9/8715* (2013.01); *G10L 15/22* (2013.01); *G10L 2015/223* (2013.01); *H04R 1/08* (2013.01)

(56) References Cited

U.S. PATENT DOCUMENTS

| | | |
|---|---|---|
| 2007/0067104 A1 | 3/2007 | Mays |
| 2011/0102562 A1 | 5/2011 | Johnson, Jr. et al. |
| 2011/0102563 A1 | 5/2011 | Johnson, Jr. et al. |
| 2011/0181757 A1 | 7/2011 | Fish et al. |
| 2013/0245939 A1* | 9/2013 | Chang .................. G01C 21/26 701/527 |
| 2014/0156188 A1 | 6/2014 | Hart et al. |
| 2015/0192420 A1 | 7/2015 | Watters et al. |
| 2015/0211874 A1 | 7/2015 | Paek et al. |
| 2015/0268057 A1 | 9/2015 | Tuukkanen |
| 2016/0187651 A1 | 6/2016 | Border et al. |
| 2017/0094258 A1 | 3/2017 | Cooper |
| 2017/0276497 A1 | 9/2017 | Andrew et al. |
| 2019/0179331 A1 | 6/2019 | Heo et al. |
| 2020/0184849 A1* | 6/2020 | Spence ........... B60W 30/18145 |
| 2020/0371378 A1 | 11/2020 | Makinen et al. |
| 2021/0055549 A1 | 2/2021 | Chang et al. |
| 2021/0112647 A1 | 4/2021 | Coleman |
| 2021/0329892 A1 | 10/2021 | Kozachenok et al. |

OTHER PUBLICATIONS

United States Patent and Trademark Office. U.S. Appl. No. 17/534,982, filed Nov. 24, 2021, pp. 1-45.

United States Patent and Trademark Office. U.S. Appl. No. 17/534,987, filed Nov. 24, 2021, pp. 1-54.

United States Patent and Trademark Office. U.S. Appl. No. 17/539,365, filed Dec. 1, 2021, pp. 1-44.

* cited by examiner

| TIME-STAMP | LATITUDE | LONGITUDE | TRIGGER? | AUDIO | PICTURE | USER RANK |
|---|---|---|---|---|---|---|
| 2021 sep 02 15:12:41.211 EST | 42.520772 | -83.047195 | 0 | (EMPTY) | (EMPTY) | |
| 2021 sep 02 15:13:41.211 EST | 42.536155 | -83.047753 | 1 | 🔊 | 📷 | ☆☆☆ |
| ⋮ | ⋮ | ⋮ | 0 | (EMPTY) | (EMPTY) | |
| ⋮ | ⋮ | ⋮ | 1 | 🔊 | 📷 | ☆☆ |

FIG. 6

RECORDED ROUTE REPLAY ON AN AUGMENTED REALITY HEAD-UP DISPLAY APPLICATION

INTRODUCTION

The present disclosure relates to a replayed and annotated recording of a travel route of an automobile vehicle.

In automobile vehicle camera systems, an existing map application provides a precise location of known points of interest. There are also times when exploration during a vehicle trip to a destination is worth sharing with family and friends or worth retaining if the vehicle trip will be repeated to re-use data from the vehicle trip. Known route recording and sharing applications allow a user to record and share the route of the vehicle trip with others, however, these applications lack picture annotation capability by other users and re-display capability in a format available to a second automobile vehicle.

Thus, while current automobile vehicle camera and route recording systems achieve their intended purpose, there is a need for a new and improved camera based recording system.

SUMMARY

According to several aspects, a route recording with real-time annotation and re-display system includes a first automobile vehicle having a camera system. A first imaging display device defining a head-up display (HUD) or a head-down display is positioned within the first automobile vehicle and receives camera imaging data from the camera system. The HUD or the head-down display includes a video display screen presenting the camera imaging data. A first microphone array receives voice data of a first user of the first automobile vehicle. A recorded-route-replay is created by adding a user input of the first user of the first automobile vehicle including the voice data, the recorded-route-replay identifying specific coordinates or locations along a travel route driven by the first automobile vehicle including the voice data after activating recording of the camera imaging data. A website receives the recorded-route-replay uploaded from the first automobile vehicle and saves the recorded-route-replay for subsequent download to a second automobile vehicle upon initiating operation of the second automobile vehicle.

In another aspect of the present disclosure, a global positioning system (GPS) generated coordinate is added to the recorded-route-replay identifying a location of a point-of-interest identified by the user of the first automobile vehicle.

In another aspect of the present disclosure, a keyword is entered by a second user of the second automobile vehicle to initiate download of the recorded-route-replay to the second automobile vehicle.

In another aspect of the present disclosure, a second imaging display device defining a head-up display (HUD) or a head-down display positioned within the second automobile vehicle acts to replay the recorded-route replay.

In another aspect of the present disclosure, a microphone array receives voice data of the second user of the second automobile vehicle.

In another aspect of the present disclosure, an image screen of the augmented reality HUD or the head-down display of the second automobile vehicle presents the travel route previously taken by the first automobile vehicle and now being driven by the second automobile vehicle.

In another aspect of the present disclosure, a ranking input is provided by the second user to the recorded-route-replay.

In another aspect of the present disclosure, a prompt is provided to the second user upon completion of a second travel route of the second automobile vehicle requesting the second user to update data of the recorded-route-replay.

In another aspect of the present disclosure, a predefined keyword is spoken by the second user to activate audio recording at any location of the second automobile vehicle along the second travel route.

In another aspect of the present disclosure, a global positioning system (GPS) generated coordinate is added to the recorded-route-replay identifying a point-of-interest identified by the first user of the first automobile vehicle.

According to several aspects, a method for replaying route data with annotation for re-display comprises: recording a recorded-route-replay by a first user of a first automobile vehicle and saving the recorded-route-replay to a website; electing to trigger playback of the recorded-route-replay by a second user of a second automobile vehicle and entering a predetermined key word by the second user to trigger playback; contacting a website and downloading from the website GPS tagged pictures for a predetermined next trip travel distance of the second automobile vehicle; and retrieving one of the GPS tagged pictures when a GPS trigger location is reached during the trip of the second automobile vehicle and displaying the one of the GPS tagged pictures on an image screen of a head-up display of second automobile vehicle.

In another aspect of the present disclosure, the method further includes displaying on the augmented reality HUD or the head-down display of the second automobile vehicle a navigation arrow indicating a direction of travel recommended by the first user for the second automobile vehicle to take.

In another aspect of the present disclosure, the method further includes presenting a message on the augmented reality HUD or the head-down display of the second automobile vehicle defining at least one of a recommendation of the first user for food, a sightseeing stop, and a negative review provided by the first user during the recording of the recorded-route-replay.

In another aspect of the present disclosure, the method further includes sharing the recorded-route-replay via a cell phone application of a cellular phone of the second user to be entered into the second automobile vehicle.

In another aspect of the present disclosure, the method further includes providing option information to the second user via synthetic speech after the second user elects to playback the recorded-route-replay and enters the key word; and identifying by speech of the user of the second automobile vehicle a type of interest desired to be reviewed.

In another aspect of the present disclosure, the method further includes downloading the data saved as the recorded-route-replay from the website prior to reaching the GPS coordinate and discarding the data after replay is complete.

In another aspect of the present disclosure, the method further includes adding user annotations to a content of the recorded-route-replay; and assigning prioritizing values to the user annotations to be displayed.

According to several aspects, a method for replaying route data with annotation for re-display comprises: generating a recorded-route-replay using a global positioning system (GPS) generated map identifying a travel route taken by a first automobile vehicle having a first user; contacting a website and transferring from the website the recorded-route-replay to a second automobile vehicle; continuously applying a set of GPS coordinate data to the recorded-route-replay defining a current location of the second automobile vehicle; adding an audio data input by a second user including voice data to the recorded-route-replay, such that the recorded-route-replay identifies specific coordinates or locations along a travel route driven by the second automobile vehicle; and displaying the recorded-route-replay to a second user of the second automobile vehicle using an augmented reality head-up display (HUD) or a head-down display of the second automobile vehicle.

In another aspect of the present disclosure, the method further includes initiating a start of the recorded-route-replay when a first keyword is received from the second user.

In another aspect of the present disclosure, the method further includes initiating operation of a microphone array of the second automobile vehicle to receive and record a voice data of the second user; and annotating the recorded-route-replay to add a GPS location together with the voice data from the microphone array.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6 is a datalog table recorded and saved during an exemplary operation of the system of FIG. 1;

DETAILED DESCRIPTION

The following description is merely exemplary in nature and is not intended to limit the present disclosure, application, or uses.

Figure 1:
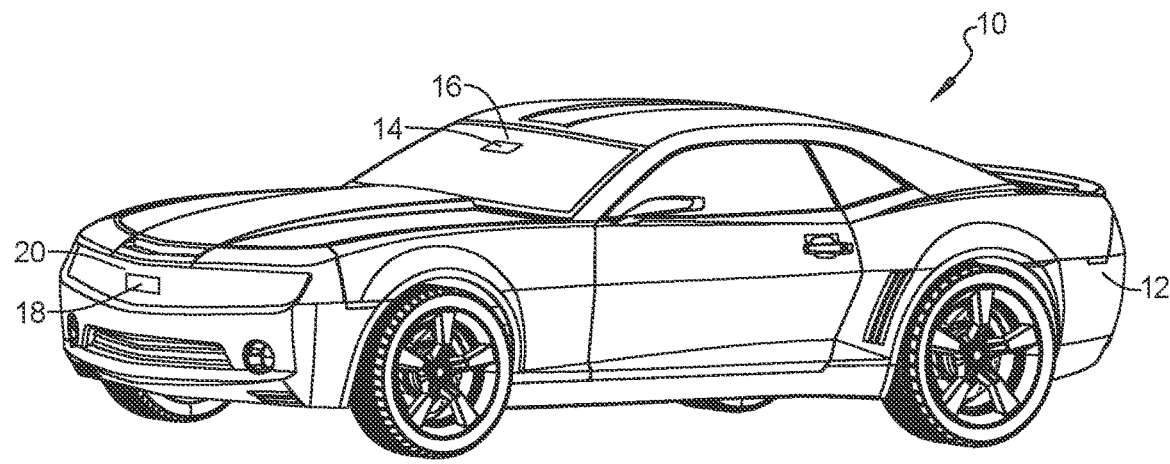
FIG. 1 is a left side elevational view of an automobile vehicle having a recorded route replay system according to an exemplary aspect.

Referring to FIG. 1, a recorded route replay system 10 is provided in a first automobile vehicle 12 having one or more camera systems. A camera system which may define a first front directed camera module 14 may be positioned in a rearview mirror housing 16 within a passenger compartment of the first automobile vehicle 12. An alternate camera location for a second front directed camera module 18 may be in a front grill 20 of the first automobile vehicle 12. Other locations on or in the first automobile vehicle 12 for the camera system or the front directed camera module 14 may also be selected. In the discussion that follows the first front directed camera module 14 is described in greater detail, however the discussion applies equally to operation of the second front directed camera module 18 if the second front directed camera module 18 or other camera module is used.

Referring to FIG. 2 and again to FIG. 1, the camera system defining the first front directed camera module 14 of the recorded route replay system 10 described in reference to FIG. 1 generates and sends camera imaging data to an imaging display device such as a head-up display (HUD) 22 positioned within the first automobile vehicle 12. The HUD 22 may be positioned in a front dashboard 24 and may include a video display screen 26 presenting the camera imaging data either in real-time or re-displayed from a pre-recorded image file described below. According to several aspects the head-up display (HUD) 22 may be replaced by a head-down display and further discussion of the head-up display (HUD) 22 herein applies equally to a head-down display.

The camera imaging data created by the first front directed camera module 14 and the recorded route replay system 10 provide for integration of the imaging data from the first front directed camera module 14 together with an audio data received from a microphone array 28 in the form of a vehicle user voice data when selected by a first user such as an operator or a passenger of the first automobile vehicle 12. The imaging data may be recorded by selection of a recording command control 30 and the imaging data together with the voice data may be combined with an existing route recording application to add more information to the recorded route. The first user is able to create a recorded-route-replay 32 by adding personal input including the voice data of the first user at specific coordinates or locations through the voice data by activating the recording command control 30 and by activating recording of the camera imaging data generated by the front camera module 14 using the recording command control 30. The first user is thereafter able to recall and replay the recorded-route-replay 32 and to share the recorded-route-replay 32 with other travelers or second users, allowing the second users to feel like the first user is traveling with him/her thereby making the other traveler trip more interesting.

Figure 2:
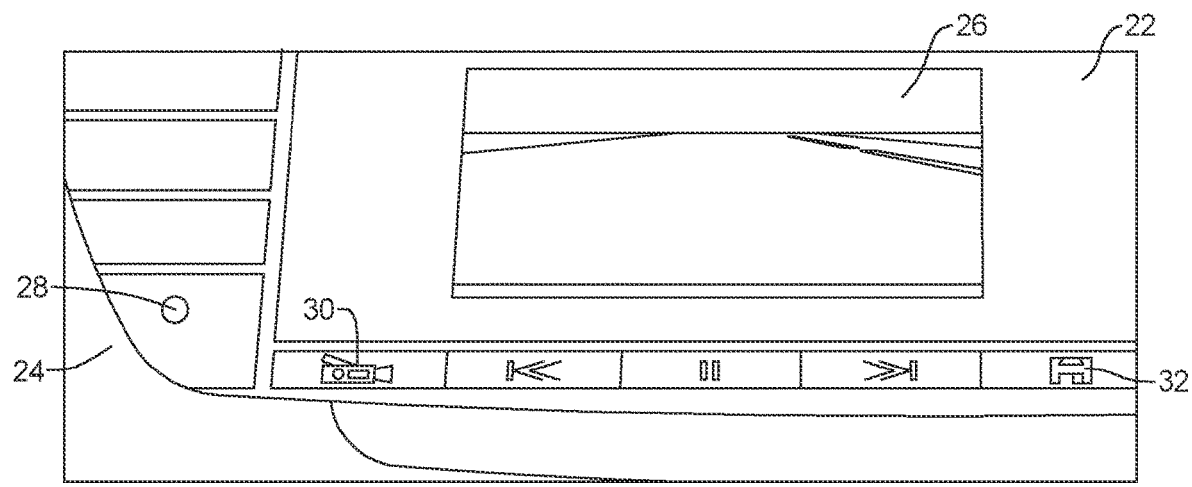
FIG. 2 is an end elevational view looking forward of a head-up display of the automobile vehicle of FIG. 1.

Referring to FIG. 3 and again to FIGS. 1 and 2, the recorded route replay system 10 may be operated in three phases or stages. These include in a first stage 34 the creation of the recorded-route-replay 32 using a global positioning system (GPS) generated map 36 identifying a route 38 taken by the first automobile vehicle 12. The route 38 may be initiated a route start point 40 and conclude with a route end point 42. The route 38 represents one or more highways, roadways, streets, bridges, tunnels, and the like between the route start point 40 and the route end point 42. GPS coordinate data is continuously applied to identify a current location of the first automobile vehicle 12 along the route 38 such that the GPS coordinate data is applied to any entry made by the first user into the recorded route replay system 10.

Data defining the recorded-route-replay 32, as well as the camera imaging data from the first front directed camera module 14 and the voice data received from the microphone array 28 is forwarded to, saved in a memory of, and accessible for future replay from a controller 44 positioned within the first automobile vehicle 12. According to several aspects, the controller 44 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

In a second stage 46 the data defining the recorded-route-replay 32 may be shared with one or more other parties including with a second user of a second automobile vehicle 48. Data sharing may be via data uploaded and downloaded from a cloud-based data system, a cell phone application 50 of a cellular phone of the second user which may then be entered into a recorded route replay system 10 of the second automobile vehicle 48. The data defining the recorded-route-replay 32 may also be transferred using a data transfer protocol such as a V2V protocol 52. The V2V protocol 52 is defined as "vehicle-to-vehicle" communication which is an automobile technology that allows multiple automobiles to "talk" to each other. V2V communications define an ad hoc network on roadways.

According to several aspects, the second automobile vehicle 48 may also include its own head-up display or second HUD 56 similar to the HUD 22 which as noted above and for the same reasons may be replaced by a head-down display. The second automobile vehicle 48 also includes a second one of the microphone arrays 28 which receives input including a second voice data such as predefined keywords and voice commands from the second user of the second automobile vehicle 48 which may be used to further annotate the recorded-route-replay 32.

In a third stage 54 the recorded-route-replay 32 after being imported to at least the second automobile vehicle 48 is displayed on the second HUD 56 of the second automobile vehicle 48. An image screen 58 of the second HUD 56 presents the route 38 previously taken by the first automobile vehicle 12 and now being driven by the second automobile vehicle 48. The second HUD 56 may be displayed on a windshield 60 of the second automobile vehicle 48 and may present a navigation arrow 62 indicating a recommended direction of travel for the second automobile vehicle 48. A message 64 may also be presented on the second HUD 56 such as a recommendation for food, a good sightseeing stop, or a negative review provided by the first user of the first automobile vehicle 12 during the recording of the recorded-route-replay 32.

Figure 4:
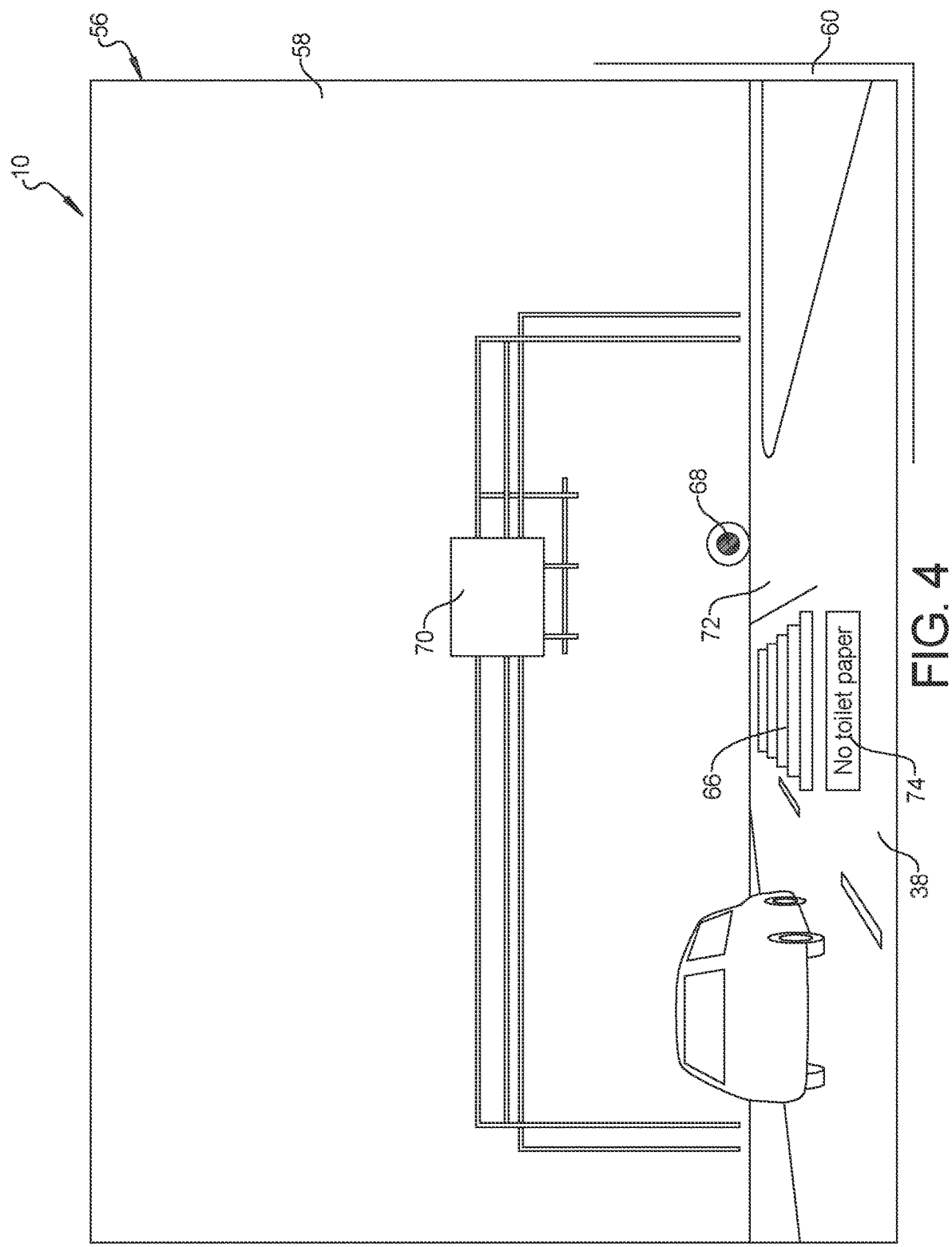
FIG. 4 is an end elevational view looking forward of a head-up display of a second automobile vehicle using the system of FIG. 1.

Referring to FIG. 4, as the second automobile vehicle 48 travels the route 38 the image screen 58 of the HUD 56 presents a highlighted upcoming travel portion 66 of the route 38. As the second automobile vehicle 48 encounters features identified by the first user of the first automobile vehicle 12 multiple indications may be presented. These may include camera images such as the camera images shown and described in reference to FIGS. 7 through 10, as well as a symbol 68 which may be for example a negative report symbol indicating for example that an upcoming rest area identified by a rest area sign 70 which is accessible via an exit 72 may be undesirable, indicated by a negative message 74. Sufficient time is provided for the operator of the second automobile vehicle 48 to decide if the exit 72 should be taken to use the rest area identified and to follow any advice provided by the recorded-route-replay 32.

Figure 5:
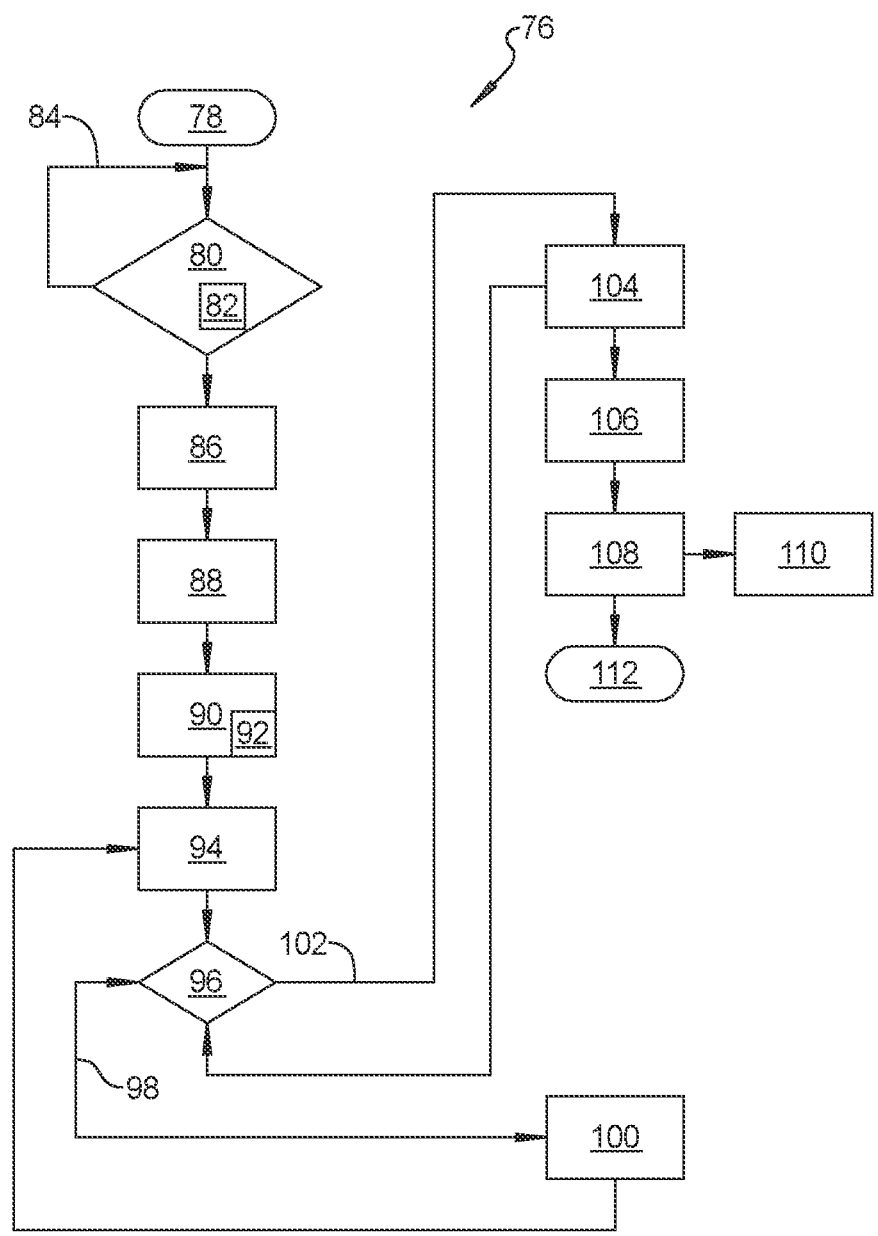
FIG. 5 is a flow diagram of method steps for operating the system of FIG. 1.
Figure 7:
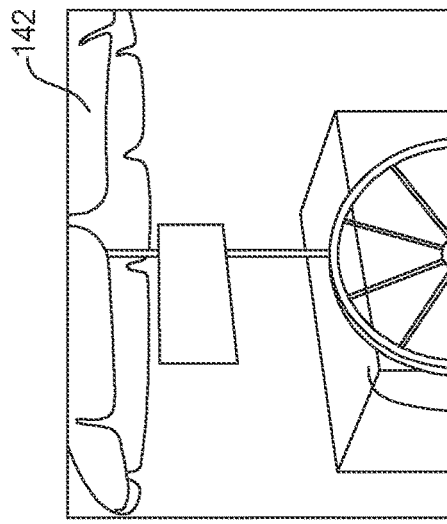
FIG. 7 is an elevational view of a street food vendor captured using the camera of the system of FIG. 1.
Figure 8:
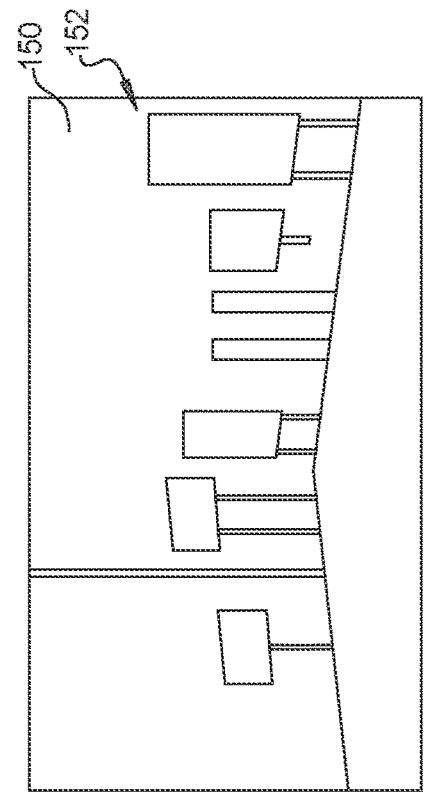
FIG. 8 is an elevational view of a street food vendor captured using the camera of the system of FIG. 1.
Figure 9:
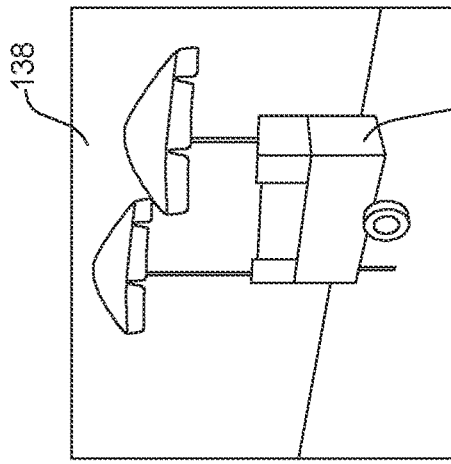
FIG. 9 is an elevational view of an off-roadway vegetable stand captured using the camera of the system of FIG. 1.

Referring to FIG. 5, a flow diagram 76 presents method steps to use the recorded route replay system 10. In a system initiation step 78 a trip start is initiated for the second automobile vehicle 48. In a following trigger query 80 the user of the second automobile vehicle 48 makes an election whether to trigger playback of the recorded-route-replay 32 and enters a predetermined key word 82 to trigger playback. If the user elects "NO" 84 not to playback the recorded-route-replay 32, the program returns to the trigger query 80. If the user elected to playback the recorded-route-replay 32 and entered the key word 82, in an option presentation step 86, the recorded route replay system 10 provides option information to the user via synthetic speech. Following the option presentation step 86, in an election step 88 the user of the second automobile vehicle 48 identifies by speech a type of interest desired to be reviewed. A contact step 90 is then conducted wherein the second automobile vehicle 48 contacts a website 92 and downloads from the website 92 GPS tagged pictures for a predetermined next trip travel distance, for example for the next upcoming ¼ mile. When a GPS trigger location 94 is reached during the trip, the appropriate GPS tagged picture is retrieved and displayed on the image screen 58 of the HUD 56, which may further include point-of-interest pins.

It is noted that picture and audio content having a highest user ranking as discussed further in reference to FIG. 6 may be given the highest priority for display order if more than one picture is available. The user of the second automobile vehicle 48 may elect in a priority query 96 if the information should be displayed in an order of priority previously assigned. If the user elects YES 98 to present content in its order of priority, in a pause step 100 a currently presented picture of lower priority is paused and a picture having a higher priority is presented on the image screen 58 of the HUD 56. If the user elects NO 102 not to present content in its order of priority a continue replay step 104 is conducted. The program may return periodically to the priority query 96 to query if there is additional information that should be displayed in the order of priority previously assigned. Upon completion of the continue replay step 104, in a prompt step 106 the recorded route replay system 10 prompts the second user to update or comment on any content desired. Examples of user comments may be to enter a "thumbs-up" or a "thumbs-down" symbol, or to add a statement such as "Outdated" or "Inappropriate". Seasonal related updates may also be entered. After completion of the prompt step 106, the recorded route replay system 10 publishes new comments to the website 92. Using second user input, in a ranking step 110 the website 92 applies ranking input to rank content for relevance and utility. At a trip end step 112, the second automobile vehicle 48 and the recorded route replay system 10 end operation.

Referring to FIG. 6 and again to FIG. 5, an exemplary datalog 114 may be populated upon the occurrence of selections made by the first user or the second user as discussed above in reference to FIG. 5. The datalog 114 includes a time-stamp column 116, a latitude column 118, a longitude column 120, a trigger column 122, an audio file status column 124, a picture file status column 126, and a user rank column 128. Initially, after the user elects during the trigger query 80 to trigger playback of the recorded-route-replay 32 and enters the predetermined key word 82 the datalog 114 is created which includes items in a first data row 129 including the timestamp, the current latitude and the current longitude. The trigger column 122, the audio file status column 124, the picture file status column 126 and the user rank column 128 are initially at "0" or identify a status of "empty". At a second time defined by a second data row 130, the time stamp, the latitude and the longitude values have changed, and a "1" is entered in the trigger column 122 indicating the user has elected to playback the recorded-route-replay 32. An audio symbol 132 is entered in the audio file status column 124, a video symbol 134 is entered in the picture file status column 126 and a user rank symbol 136 is entered in the user rank column 128. Data may thereafter be added, changed or deleted from the datalog 114.

Referring generally to FIGS. 7 through 10, exemplary travel points of interest to the user of the first automobile vehicle 12 are shown as presented on the HUD 56 of the second automobile vehicle 48. With specific reference to FIG. 7, a camera image 138 of an unnamed food stand 140 identified having for example good food was saved and transferred to the second automobile vehicle 48. A voice recording providing additional information may also be played. According to several aspects, the unnamed food stand 140 includes GPS coordinate data which triggers display of the unnamed food stand 140 on the image screen 58 of the HUD 56 as the second automobile vehicle 48 approaches the unnamed food stand 140, which further triggers audio data playback, as well as any visual data such as directional arrows to assist the user of the second automobile vehicle in locating the unnamed food stand 140.

Figure 3:
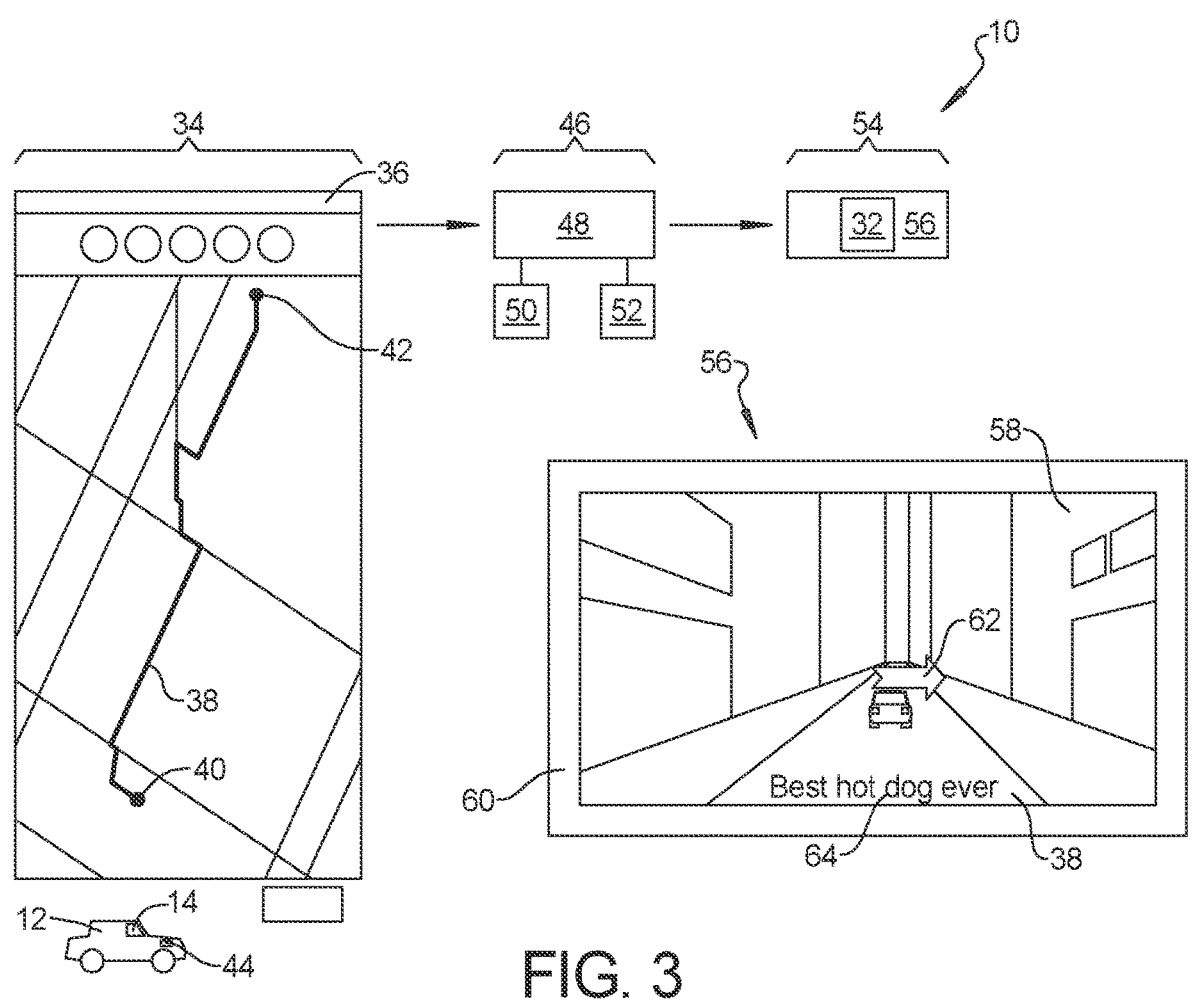
FIG. 3 is a flow diagram of three operational stages for using the system of FIG. 1.

Referring to FIG. 8 and again to FIGS. 2 and 3, a camera image 142 of a food stand 144 identified having for example undesirable food quality may be saved, commented on and transferred to the second automobile vehicle 48. As previously noted, a voice recording providing additional information may also be played and points of interest are played back to the image screen 58 of the HUD 56.

Referring to FIG. 9 and again to FIGS. 2 and 3, a camera image 146 of a fruit stand 148 having what is deemed by the first user of the first automobile vehicle 12 the best fruit prices on the route 38 may have been saved, commented on and transferred to the second automobile vehicle 48 for playback. As previously noted, a voice recording providing additional information may also be played and points of interest are played back to the image screen 58 of the HUD 56.

Figure 10:
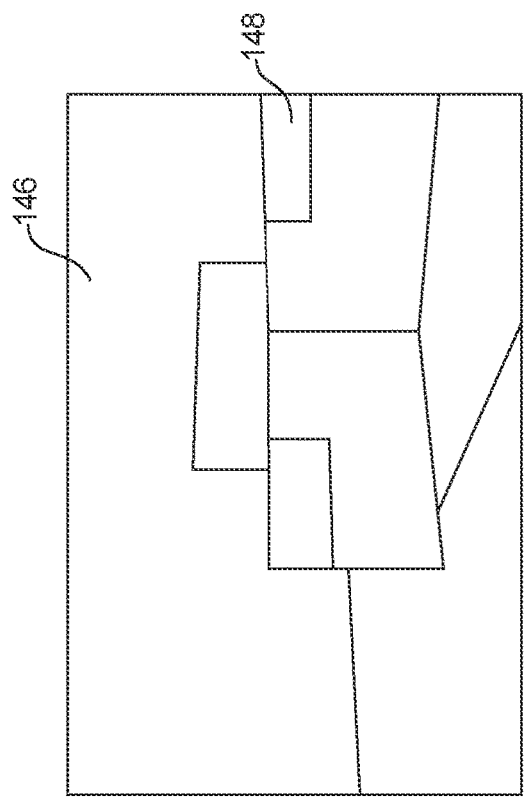
FIG. 10 is an elevational view of an off-roadway shopping store parking area captured using the camera of the system of FIG. 1.

Referring to FIG. 10, a camera image 150 of a roadside store 152 having what is deemed the best clothing prices on the route 38 may have been saved, commented on and transferred for playback to the second automobile vehicle 48. As previously noted, a voice recording providing additional information may also be played and points of interest are played back to the image screen 58 of the HUD 56.

With continuing reference to FIGS. 7 through 10 the camera images 138, 142, 146, 150 which are captured further define highlight images 138, 142, 146, 150. During recording, image processing is conducted to identify potential objects of interest such as the unnamed food stand 140. Audio processing is then conducted to identify one or more key words 82, and to map the audio content with the object of interest. The user then annotates the captured image with the key words 82 added. An augmented reality graphic such as the highlight images 138, 142, 146, 150 are added based on the predefined keyword and the object of interest. The column is then added to the datalog 114 discussed in reference to FIG. 6 to identify an augmented reality graphic. The user rank defined for example by the user rank symbol 136 may then be added to the datalog 114 to identify a further distinguishing characteristic for future use.

A recorded route replay system 10 of the present disclosure includes audio input to allow the user to provide a user opinion verbally. The user may activate a front camera recording function at a common point-of-interest or at a non-typical point-of-interest. The audio and video recording is annotated for playback by a second automobile vehicle 48. The recorded-route-replay 32 is shared with other users and displayed on an information display or HUD of the other or second automobile vehicles.

With respect to the controller 44 discussed above, the memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an electronic control unit (ECU). Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a random access memory (RAM), a PROM, an erasable programmable read-only memory (EPROM), a FLASH electrically erasable programmable read-only memory (EEPROM), any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the Procedural Language extensions to the Structured Query Language (PL/SQL) mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations, and should in no way be construed so as to limit the claims.

The replay videos are user selectable information types such as for example Friends, Geographical and Historical, and are GPS triggered. The data saved as the recorded-route-replay 32 is downloaded from the website 92 just prior to appropriate GPS coordinate and expires or is discarded after replay. The user annotations and rankings prioritize content to be displayed. Business content is allowed including ads for fast food and gas if requested by the user.

During information retrieval and display, the annotated route is imported from the cloud or from the website 92 and the navigation arrow 62 is displayed on the HUD 56. The recorded audio is played, the picture saved and retrieved from the cloud or the website 92 is played, and the secondary user or users may add further comments or content, which may be saved for further use and replay.

The system of the present disclosure allows the integration of the front-camera module 14 and a microphone array 28 with the existing route recording application to generate a recorded-route-replay 32. The user is able to add personal input at one or more specific coordinates which may be GPS coordinates or locations through audio input. The user may then activate picture capturing using the front camera module 14. The user is further able to share the recorded-route-replay 32 with their friends. The friend will feel like the user is traveling with him/her and the trip is more interesting. Replay is achieved via download of video/audio clips from a website and is triggered by key words 82 or other methods and replayed at a relevant GPS coordinate. Upon replay, the users can further annotate and rank the content and the users may select ad content from businesses that are appropriate to the current context such as but not limited to gas, restaurants and fast-food businesses.

A recorded route replay system 10 of the present disclosure offers several advantages. These include playback of the integrated existing route-recording applications with annotations from the front camera module 14 and the microphone array 28. This integration enables playback of the recorded-route-replay 32 during any subsequent vehicle operation equipped to download the recorded-route-replay 32. The recorded route with audio and video annotation when shared with other users and displayed in an augmented reality format also provides playback options to the second user, including ranking of multiple ones of the point-of-interest and other similar data.

Accordingly, it is to be understood that the above description is intended to be illustrative and not restrictive. Many implementations and applications other than the examples provided would be apparent to those of skill in the art upon reading the above description. The scope of the present disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the invention is capable of modification and variation and is limited only by the following claims.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A route recording with real-time annotation and re-display system, comprising:
   a first automobile vehicle having a camera system;
   a first imaging display device defining a head-up display (HUD) or a head-down display positioned within the first automobile vehicle and receiving a camera imaging data from the camera system, the HUD or the head-down display having a video display screen presenting the camera imaging data;
   a first microphone array receiving a first voice data of a first user of the first automobile vehicle;
   a recorded-route-replay created by adding a user input of the first user of the first automobile vehicle including the first voice data, the recorded-route-replay including specific coordinates or locations along a travel route driven by the first automobile vehicle and including the first voice data after activating recording of the camera imaging data;
   a website receiving and saving the recorded-route-replay uploaded from the first automobile vehicle;
   a second automobile vehicle downloading the recorded-route-replay from the website; and
   a second microphone array receiving a second voice data of a second user of the second automobile vehicle while the second automobile vehicle is traveling along the travel route driven by the first automobile vehicle;
   wherein the recorded-route-replay is updated to include the second voice data of the second user that is associated with at least one specific coordinate or location along the travel route driven by the first automobile vehicle.

2. The system of claim 1, further including a second imaging display device defining second a head-up display (HUD) or a head-down display positioned within the second automobile vehicle presenting the recorded-route-replay.

3. The system of claim 2, further including an image screen of the second HUD or the head-down display of the second automobile vehicle presenting the travel route previously taken by the first automobile vehicle and now being driven as a second travel route of the second automobile vehicle.

4. The system of claim 3, further including multiple GPS tagged pictures saved in the recorded-route-replay, wherein when a GPS trigger location is reached during the second travel route of the second automobile vehicle one of the GPS tagged pictures is displayed on the image screen of the second HUD of the second automobile vehicle.

5. The system of claim 1, further including a predefined keyword entered by a second user of the second automobile vehicle to initiate download of the recorded-route-replay to the second automobile vehicle.

6. The system of claim 5, further including a second microphone array receiving a second voice data of the second user of the second automobile vehicle.

7. The system of claim 5, further including a ranking input by the second user to the recorded-route-replay.

8. The system of claim 5, further including a prompt provided to the second user upon completion of a second travel route of the second automobile vehicle requesting the second user to update data of the recorded-route-replay.

9. The system of claim 5, further including a predefined keyword spoken by the second user to activate audio recording at any location of the second automobile vehicle along the second travel route.

10. The system of claim 1, further including a global positioning system (GPS) generated coordinate added to the recorded-route-replay identifying a point-of-interest identified by the first user of the first automobile vehicle.

11. A method for replaying route data with annotation for re-display, comprising:
 recording a recorded-route-replay of a first travel route of a first automobile vehicle by a first user of the first automobile vehicle and saving the recorded-route-replay to a web site;
 electing to trigger a playback of the recorded-route-replay by a second user of a second automobile vehicle and entering a predetermined key word by the second user to trigger the playback of the recorded-route-replay;
 contacting the website and downloading from the website multiple GPS tagged pictures for a predetermined travel distance of a second travel route of the second automobile vehicle;
 retrieving one of the GPS tagged pictures when a GPS trigger location is reached during the second travel route of the second automobile vehicle and displaying the one of the GPS tagged pictures on an image screen of a head-up display of the second automobile vehicle; and
 receiving, via a microphone array of the second vehicle, a voice data of the second user of the second automobile vehicle while the second automobile vehicle is traveling along the travel route driven by the first automobile vehicle;
 wherein the recorded-route-replay is updated to include the voice data of the second user that is associated with at least one specific coordinate or location along the travel route driven by the first automobile vehicle.

12. The method of claim 11, further including displaying on the head-up display of the second automobile vehicle a navigation arrow indicating a direction of travel recommended by the first user for the second automobile vehicle to take.

13. The method of claim 12, further including presenting a message on the head-up display of the second automobile vehicle defining at least one of a recommendation of the first user for food, a sightseeing stop, and a negative review provided by the first user during the recording of the recorded-route-replay.

14. The method of claim 11, further including sharing the recorded-route-replay via a cell phone application of a cellular phone of the second user to be entered into the second automobile vehicle.

15. The method of claim 11, further including:
 providing option information to the second user of the second automobile vehicle via synthetic speech after the second user elects to playback the recorded-route-replay and enters the predetermined key word; and
 identifying by speech of the second user of the second automobile vehicle a type of interest desired to be reviewed.

16. The method of claim 11, further including downloading a data file of the recorded-route-replay from the website prior to reaching the GPS trigger location and discarding the data file after replay is complete.

17. The method of claim 11, further including:
 adding user annotations to a content of the recorded-route-replay; and
 assigning prioritizing values to the user annotations to be displayed.

18. A method for replaying route data with annotation for re-display, comprising:
 creating a recorded-route-replay using a global positioning system (GPS) generated map identifying a first travel route taken by a first automobile vehicle having a first user;
 uploading the recorded-route-replay to a website;
 contacting the website by a second user of a second automobile vehicle and transferring from the website the recorded-route-replay to the second automobile vehicle;
 continuously applying a set of GPS coordinate data to the recorded-route-replay defining a current location of the second automobile vehicle along a second travel route of the second automobile vehicle;
 adding an audio data input by the second user of the second automobile vehicle including a voice data to the recorded-route-replay, the recorded-route-replay identifying specific coordinates or locations along the second travel route of the second automobile vehicle; and
 displaying the recorded-route-replay to the second user of the second automobile vehicle using an augmented reality head-up display (HUD) or a head-down display of the second automobile vehicle.

19. The method of claim 18, further comprising:
 receiving, via a first microphone array of the first automobile vehicle, a first voice data of the first user; and
 including, prior to the uploading, the first voice data of the first user with the recorded-route-replay.

20. The method of claim 19, further including:
 initiating operation of a microphone array of the second automobile vehicle to receive and record the voice data of the second user; and
 annotating the recorded-route-replay to add a GPS location together with the voice data from the microphone array.

* * * * *